(12) United States Patent
Voss et al.

(10) Patent No.: US 7,648,203 B2
(45) Date of Patent: Jan. 19, 2010

(54) FITTING FOR A VEHICLE SEAT

(75) Inventors: Heinz Voss, Leverkusen (DE); Tobias Ewald, Essen (DE); Ulrich Lehmann, Alfter (DE); Artur Komainda, Remscheid (DE); Rainer Messerschmidt, Düsseldorf (DE); Grit Scholz, Remscheid (DE); Andreas Norbisrath, Wuppertal (DE); Jürgen Stemmer, Remscheid (DE); Heinrich Busch, Remscheid (DE); Holger Finner, Hückeswagen (DE); Dirk Angermann, Wermelskirchen (DE); Markus Vesper, Witten (DE); Gregor Vossmann, Remscheid (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 13 days.

(21) Appl. No.: 11/821,470

(22) Filed: Jun. 22, 2007

(65) Prior Publication Data

US 2007/0290540 A1  Dec. 20, 2007

Related U.S. Application Data

(63) Continuation of application No. PCT/EP2005/013427, filed on Dec. 14, 2005.

(30) Foreign Application Priority Data

Dec. 23, 2004  (DE) .................. 10 2004 062 050

(51) Int. Cl.
    *B60N 2/225*  (2006.01)
(52) U.S. Cl. ....................................... 297/362
(58) Field of Classification Search ............. 297/362, 297/367, 378.12; 475/162, 175
    See application file for complete search history.

(56) References Cited

U.S. PATENT DOCUMENTS

| 5,154,475 | A |   | 10/1992 | Kafitz |
|5,277,672|A||1/1994|Droulon et al.|
|5,452,938|A|*|9/1995|Ernst ........................ 297/362|

(Continued)

FOREIGN PATENT DOCUMENTS

DE  39 14 084 A1  10/1990

(Continued)

OTHER PUBLICATIONS

U.S. Appl. No. 11/821,427, filed Jun. 22, 2007; In re: Heinz Voss et al., entitled *Fitting for a Vehicle Seat*.

*Primary Examiner*—Peter R. Brown
(74) *Attorney, Agent, or Firm*—Womble Carlyle Sandridge & Rice, PLLC (57) ABSTRACT

The invention relates to a fitting (10) for the seat of a vehicle, particularly a motor vehicle, comprising a first fitting part (11), a second fitting part (12) which is mechanically linked to the first fitting part (11), a locking eccentric, and a running eccentric (131), wherein the running eccentric (131) is mounted in relation to the first fitting part (11) and second fitting part (12) by way of a rolling bearing or sliding bearing bushing (28,33), wherein friction between the running eccentric (131) and the sliding bearing bushings (28,33) or between at least one sliding bearing bushing (28, 33) and the associated fitting part (11, 12) is lower than the friction between the locking eccentric and at least one of the fitting parts (11, 12).

23 Claims, 8 Drawing Sheets

U.S. PATENT DOCUMENTS

| | | | |
|---|---|---|---|
| 5,524,970 A * | 6/1996 | Kienke et al. ............... 297/362 |
| 5,871,414 A | 2/1999 | Voss et al. |
| 6,305,748 B1 | 10/2001 | Ohba |
| 6,619,743 B1 | 9/2003 | Scholz et al. |
| 6,830,298 B2 * | 12/2004 | Koczewski ................. 297/362 |
| 6,918,635 B2 | 7/2005 | Finner et al. |
| 7,086,699 B1 | 8/2006 | Addison et al. |
| 7,090,298 B2 | 8/2006 | Lange |
| 7,243,994 B2 | 7/2007 | Cha |

FOREIGN PATENT DOCUMENTS

| | | |
|---|---|---|
| DE | 39 41 215 A1 | 6/1991 |
| DE | 195 17 441 C1 | 10/1996 |
| DE | 195 48 809 C1 | 5/1997 |
| EP | 0 696 525 A1 | 2/1996 |

* cited by examiner

FITTING FOR A VEHICLE SEAT

CROSS-REFERENCE TO RELATED APPLICATION

The present application is a continuation of International Application PCT/EP2005/013427, which was filed Dec. 14, 2005. The entire disclosure of International Application PCT/EP2005/013427, which was filed Dec. 14, 2005, is incorporated herein by reference.

BACKGROUND OF THE INVENTION

The present invention relates to a fitting for a vehicle seat, in particular for a motor vehicle seat, with the fitting having a first fitting part, a second fitting part in geared connection with the first fitting part, a locking eccentric, which is provided primarily for locking the fitting, a running eccentric, which is provided primarily for driving a relative rolling movement of the second fitting part on the first fitting part for adjusting the fitting, the locking eccentric and the running eccentric being mounted on the first fitting part and supporting the second fitting part during locking and/or adjustment, and a driver that, at the start of the adjusting movement, controls the locking eccentric for canceling the locking effect and during the adjusting movement drives the running eccentric.

A fitting of the type described immediately above is known from DE 39 41 215 A1. DE 39 41 215 A1 discloses that its fitting attaches the backrest of a vehicle seat to the seat part of the vehicle seat in a manner so that the inclination of the backrest may be adjusted. In the fitting of DE 39 41 215 A1, a locking eccentric defined by two wedge segments and a running eccentric defined by a sickle-shaped centering segment are located on a collar of the first fitting part. The locking eccentric serves for locking the fitting whereas, during the adjusting movement, the running eccentric alone undertakes the mounting and driving of the fitting parts. By the choice of materials and the shape of the components, increased friction may occur locally during the adjusting movement, which increases the necessary operating forces. With an adjusting movement counter to the loading direction, i.e. counter to the direction of a force exerted by the user on the backrest or otherwise counter to the direction of the weight force of the backrest, this is made considerably more noticeable than in the loading direction.

BRIEF SUMMARY OF SOME ASPECTS OF THE INVENTION

An aspect of the present invention is the provision of improvements to a fitting of the type described immediately above, in particular for reducing the operating forces counter to the loading direction. In accordance with one aspect of the present invention, a fitting for a vehicle seat, in particular for a motor vehicle seat, has a first fitting part, a second fitting part in geared connection with the first fitting part, a locking eccentric that is primarily (e.g., at least) for locking the fitting, a running eccentric that is primarily (e.g., at least) for driving a relative rolling movement of the second fitting part on the first fitting part for adjusting the fitting, and a driver. The driver is for controlling the locking eccentric to unlock the fitting at a start of an adjusting movement. The driver is also for driving at least the running eccentric during the adjusting movement so that the running eccentric drives the relative rolling movement of the second fitting part on the first fitting part. The locking eccentric and the running eccentric are mounted on the first fitting part and support the second fitting part during the locking of the fitting and/or the adjusting of the fitting. Bearing bushings (e.g., rolling-contact bearing bushings or plain bearing bushings) are respectively between the running eccentric and the first and second fitting parts. The friction between the running eccentric and at least one of the bearing bushings or between at least one of the bearing bushings and the associated fitting part is less than the friction between the locking eccentric and at least one of the fitting parts.

Because the running eccentric is mounted by way of rolling-contact bearing bushings or plain bearing bushings, both relative to the first fitting part and also relative to the second fitting part, a small amount of friction may be selected (e.g., may exist) between the running eccentric and the rolling-contact bearing bushing or plain bearing bushing (or between a rolling-contact bearing bushing or plain bearing bushing and the associated fitting part) which is less than the friction between the locking eccentric and at least one of the fitting parts, required to lock the fitting. This reduces the operating forces. The locking eccentric serves for locking the fitting and the positioning without play. With regard to the geometry, the bearing of the running eccentric against the rolling-contact bearing bushing or plain bearing bushing is carried out radially outwardly and radially inwardly relative to the axis of rotation thereof. Preferably, each of the two rolling-contact bearing bushings or plain bearing bushings may be connected fixedly in terms of rotation to the fitting associated therewith, for example pressed into an aperture or a collar or pressed onto a collar. Alternatively, one (or both) of the two rolling-contact bearing bushings or plain bearing bushings may be connected fixedly in terms of rotation to the running eccentric, for example pressed into or onto the running eccentric.

The running eccentric may be of sickle-shaped configuration and extend in the peripheral direction, for example over more than 180°. It is, however, possible that the running eccentric is of annular configuration, i.e. completely closed in the peripheral direction. In the variants with low-friction relative movement between the corresponding rolling-contact bearing bushing or plain bearing bushing and the associated fitting part and a sickle-shaped running eccentric, the rolling-contact bearing bushing or plain bearing bushing only requires to be formed over a part of the periphery adapted to the running eccentric, i.e. it may be configured as a sickle-shaped rolling-contact bearing segment or plain bearing segment.

The precise functional separation between the locking eccentric and the running eccentric is not present in all situations. With a locked fitting, the locking eccentric consecutively undertakes the locking function, the positioning without play and generally also the mounting of the fitting parts onto one another. However, the running eccentric is also able to contribute to the mounting of the fitting parts. During an adjusting movement counter to the loading direction, the running eccentric alone normally undertakes the mounting of the fitting parts and the driving of the rolling movement. The loading direction is the direction of a force exerted by the user onto the seat components, which is applied by way of the fitting, or otherwise the direction of the weight force of the seat components. More specifically, during an adjusting movement in the loading direction, the running eccentric primarily undertakes the mounting of the fitting parts and the driving of the rolling movement, but it is possible—depending on the situation and boundary conditions—that the locking eccentric or the components thereof assist the mounting and the driving.

The control of the locking eccentric, which preferably consists of two wedge segments, may be carried out by way of a driving segment of the driver, so that the wedge segments approach one another and cancel the locking effect, with the amount of the approach generally fluctuating and being dependent on the local frictional conditions and component tolerances. The driving of the running eccentric is also possible by way of a driving segment, which is effective with an annular running eccentric, for example inside a recess.

The control may also be carried out such that the driver brings the wedge segments to bear against one another, namely by moving both wedge segments or by moving only one wedge segment, for example the wedge segment which is loaded less relative to the loading direction. The wedge segments are preferably moved by using an annular (e.g., substantially annular) spring, which is provided in the initial locking position for pressing the wedge segments apart. The driver preferably impinges on one or both of the end fingers of the annular spring. The end fingers of the annular spring engage in the wedge segments, for example in holes thereof. The effect may be carried out by way of suitably configured sliding links which are provided, for example, on a pivotable connecting link coupled to the driver. If the running eccentric is arranged axially between the driver and the locking eccentric, slots penetrating the running eccentric may be provided, in order to allow the end fingers of the annular spring an unhindered penetration of the wedge segments.

Because the rotating driver impinges on the rotatable running eccentric without lateral force (relative to a common axis of rotation), the driving torque of the driver is applied coaxially to the running eccentric, so that a movement may be carried out under the same frictional conditions. A tipping movement about an instantaneous center of rotation triggered by lateral forces and overriding the rotation, which would lead to a local increase in friction and thus to increased operating forces, is avoided. The required freedom from lateral forces may therefore be understood such that minimal lateral forces which are required, for example, by component tolerances, are allowed, as long as they do not substantially alter the friction.

The impingement without lateral force is, for example, achieved by the contact points between the driver and the running eccentric being distributed uniformly over the periphery and being at the same distance from the common axis of rotation of the driver and of the running eccentric. In an embodiment with slot-pin-guides, which offers the advantage of idle motion to determine the time sequence of the control of the locking eccentric and the running eccentric, for example two pins and two elongated holes are arranged point symmetrically to one another relative to the axis of rotation of the driver and the running eccentric. Any association of pins and elongated holes to the driver on the one hand and to the running eccentric on the other hand being possible. It is, however, also possible to provide a rotationally fixed connection between the driver and the running eccentric, for example by the contact points—preferably defined by pins and holes—being configured without play. The rotationally fixed connection may, therefore, be developed such that the driver and the running eccentric form a single component, i.e. the driver is configured as (e.g., comprises) a running eccentric.

With the fitting according to the invention, an adjustment of the inclination of a backrest may, for example, be undertaken. The application may be extended to adjusting a further pivotable region of a vehicle seat. The fitting according to the invention is preferably designed for a manual drive but may also be driven by motor. The invention may also be used with other geared fittings, driven manually or by motor.

Other aspects and advantages of the present invention will become apparent from the following.

BRIEF DESCRIPTION OF THE DRAWINGS

The invention is described below in more detail with reference to four embodiments, together with a plurality of modifications, shown in the drawings, in which.

DETAILED DESCRIPTION OF EXEMPLARY EMBODIMENTS

Figures 1, 2:
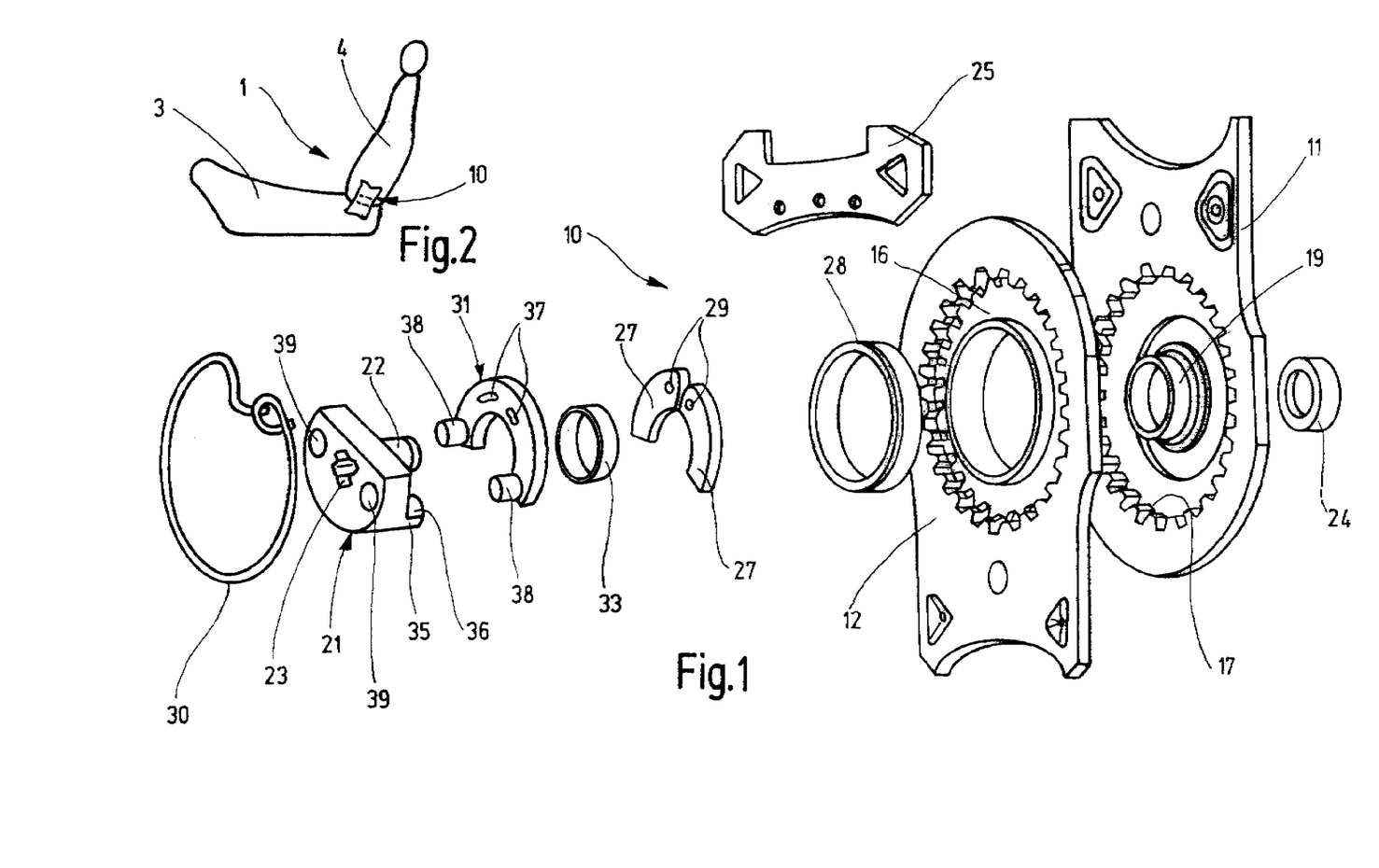
FIG. 1 is an exploded view of the first embodiment.
FIG. 2 is a schematic view of a vehicle seat.

A vehicle seat 1 for a motor vehicle comprises a seat part 3 and a backrest 4. The inclination of the backrest 4 may be manually adjusted relative to the seat part 3. The inclination adjustment of the backrest 4 is carried out by way of a handwheel provided at the side and a drive shaft that drives two fittings 10 together. The two fittings 10 are respectively attached to the two sides of the vehicle seat 1 and support the backrest 4.

Each fitting 10 is configured as a geared fitting in which a first fitting part 11 and a second fitting part 12 are connected to one another via a gear for locking and adjusting. The two fitting parts 11 and 12 have a substantially flat shape and are composed of steel. The first fitting part 11 is primarily connected to the structure of the backrest 4 (fixed to the backrest) and therefore shown at the top in the drawings. Accordingly, in the present case, the second fitting part 12 is primarily fixed to the seat part and shown at the bottom in the drawings. The positions of the fitting parts 11 and 12 may also be interchanged, so that the bearings and the movements of the components relative to one another may always be seen conceptually with respect to the system of the fitting 10, and are not limited by the relative positions of the fitting parts 11 and 12.

To form the gear, a toothed wheel 16 with an external toothing is impressed on the second fitting part 12 and a toothed ring 17 with an internal toothing is impressed on the first fitting part 11, and these toothings mesh with one another. The diameter of the addendum circle of the external toothing of the toothed wheel 16 is smaller by at least one tooth height than the diameter of the dedendum circle of the internal toothing of the toothed ring 17. The corresponding difference between the number of teeth of the toothed wheel 16 and the toothed ring 17 allows a rolling movement of the toothed ring 17 on the toothed wheel 16. The first fitting part 11 has a collar 19 that is formed on the side facing the toothed wheel 16, and the collar 19 is concentric to the internal toothing of the toothed ring 17. Directional information used hereinafter is with reference to a cylindrical coordinate system that is centered with respect to the collar 19.

A driver that is denoted in the first embodiment by 21 is mounted, by way of a central hub 22, with play in the collar 19 of the first fitting part 11. The driver 21 is, for example, composed of plastic or a metallic material. The driver 21 is provided with a central axial receiver 23 that penetrates the hub 22 and is profiled to adapt to an external splined profile of the drive shaft. On the front face of the driver 21 facing away from the hub 22, a cover disk of greater diameter may be formed on the driver 21. The driver 21 is axially secured to the outer face of the first fitting part 11 by a retaining ring 24 which is clipped on. For receiving the axially acting forces, retaining plates 25 are respectively welded onto the two fitting parts 11 and 12, and overlap the respective other fitting part, without hindering the adjusting movement. For the sake of clarity, only one of these retaining plates 25 is shown in the drawings.

Two wedge segments 27 define a locking eccentric. The wedge segments 27 are preferably produced from steel (in particular sintered material) or a different metallic material and are arranged axially between the driver 21 and the first fitting part 11. The wedge segments 27 are supported by way of their circular-arc-shaped curved inner faces on the collar 19. With their similarly circular-arc-shaped curved outer faces, which are eccentric to the inner faces, the wedge segments 27 serve for the mounting of the rolling-contact bearing bushing or plain bearing bushing, which is denoted hereinafter as the first plain bearing bushing 28. The first plain bearing bushing 28 is pressed fixedly in terms of rotation into the second fitting part 12. The friction between the first plain bearing bushing 28 and the wedge segments 27 is markedly less than the friction between the wedge segments 27 and the collar 19. The broad ends of the wedge segments 27 face one another and receive with respective holes 29 (or jaws open in the peripheral direction) respective angled end fingers of a pretensioned annular (e.g., substantially annular) spring 30. The spring 30 acts on the wedge segments 27 and presses the wedge segments apart in the peripheral direction, in order to lock the fitting 10 in the initial position.

A running eccentric, which is denoted by 31 in the first embodiment, is arranged axially adjacent to the wedge segments 27. The running eccentric 31 is, for example, made from plastic or a metallic material. The running eccentric 31 bears radially outward with its circular-arc-shaped curved outer face against the first plain bearing bushing 28 and also serves for the mounting of the first plain bearing bushing 28. The running eccentric 31 bears radially inward with its similarly circular-arc-shaped curved inner face, which is arranged eccentrically to the outer face, against a further rolling-contact bearing bushing or plain bearing bushing, which is denoted hereinafter as the second plain bearing bushing 33. The second plain bearing bushing 33 is inserted fixedly in terms of rotation into the running eccentric 31 (and may be rotated relative to the collar 19 with little force) or alternatively is located fixedly in terms of rotation on the collar 19 (the running eccentric 31 being rotatable relative to the plain bearing bushing 33). The friction between the plain bearing bushing 28 and 33, on the one hand, and the running eccentric 31 or the collar 19, on the other hand, is also markedly less than the friction between the wedge segments 27 and the collar 19.

In the locked initial position, the locking eccentric presses, in the extension of the direction of its eccentricity, the toothed wheel 16 at a thus defined engagement point into the toothed ring 17. The running eccentric 31 is aligned according to the eccentricity of the locking eccentric, so that two eccentrics are arranged adjacent to one another. The locking eccentric undertakes primarily, i.e. normally alone, the mounting of the two fitting parts 11 and 12 onto one another and the positioning without play and thus the locking effect. Optionally, the running eccentric 31 also proportionately contributes to the mounting. When the driver 21 is driven, the wedge segments 27 approach one another counter to the force of the annular spring 30 whereby the locking effect is canceled. The running eccentric 31 undertakes primarily, i.e. normally alone, the mounting of the two fitting parts 11 and 12 (and thus the driving of the rolling movement). In particular during adjusting movements in the loading direction, occasionally mixed conditions occur and one or both of the wedge segments 27 may contribute to the mounting and to the driving. The running eccentric 31 slides—during its rotation about the collar 19 of the first fitting part 11—along the second fitting part 12 by displacing the eccentricity direction and thus by displacing the point of engagement of the toothed wheel 16 in the toothed ring 17 which is represented as the wobbling rolling movement.

The aforementioned configuration of the driver 21, locking eccentric and running eccentric 31 is the same for all embodiments and the modifications thereof. Differences exist in the further detailed configuration of these and further components described hereinafter.

Figure 3:
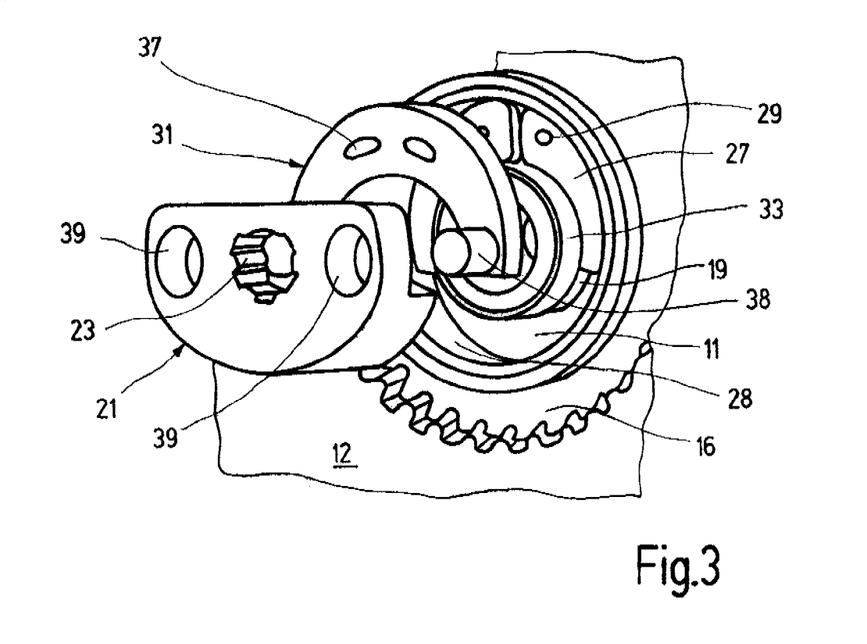
FIG. 3 is a perspective partial view of the first embodiment.

In the first embodiment, a driving segment 35 is formed on the driver 21 on the front face with the hub 22. The driving segment 35 is delimited in the peripheral direction of the driver 21 by respective driving lugs 36. The driving segment 35 grips with play with its driving lugs 36 between the narrow ends of the wedge segments 27. The running eccentric 31 is of sickle-shaped configuration and arranged axially between the driver 21 and the wedge segments 27. Two slots 37 extend in the peripheral direction and axially penetrate the running eccentric 31. The end fingers of the annular spring 30 respectively penetrate the slots 37 unhindered and with play, and then respectively extend into the holes 29 of the wedge segments 27, without coupling the wedge segments 27 to the running eccentric 31.

Two axially protruding pins 38 are formed on the running eccentric 31 on the front face facing the driver 21, and the protruding pins 38 are radially opposite one another. Each pin 38 engages in an elongated hole 39 arranged in the peripheral direction. In the initial position for each pin 38 and its respective hole 39, the pin 38 is arranged approximately in the center of the elongated hole 39. The pins 38 and the elongated holes 39 are arranged, therefore, such that when a pin 38 bears against the end (e.g., side) of the associated elongated hole 39 that is closer to the driving segment 35 (the lower end in FIGS. 1 and 3) the running eccentric 31 is still at a distance from the driving lug 36.

During the driving, a torque is firstly introduced into the driver 21 and then transferred to the locking eccentric by one of the driving lugs 36 impinging on the associated wedge segment 27 and pressing the wedge segments 27 together. If, with the further rotation of the driver 21, the idle motion predetermined by the elongated holes 39 is passed through, the running eccentric 31 is impinged upon on the pins 38 and driven.

Because two systems of pins 38 and elongated holes 39 radially opposing one another are provided, the impingement and driving of the running eccentric 31 is carried out by the driver 21 without lateral forces, i.e. the torque acts (point) symmetrically to the centrally arranged axis of rotation of the driver 21. The running eccentric 31 then slides with substantially the same (low) friction at each of the plain bearing bushings 28 and 33. With lateral forces, i.e. a torque acting asymmetrically, a tipping of the running eccentric 31 would take place about an instantaneous axis of rotation (at the contact point between the driver 21 and the running eccentric 31) which might result in a slight local increase in the normal force of the running eccentric 31 onto the plain bearing bushings 28 and 33 and thus a slightly increased friction.

Modifications are possible to the disclosed first embodiment without lateral force, which differ in the control of the wedge segments 27 or the mounting. This control is carried out by using the annular spring 30 so that the driving segment 35 is omitted.

Figure 4:
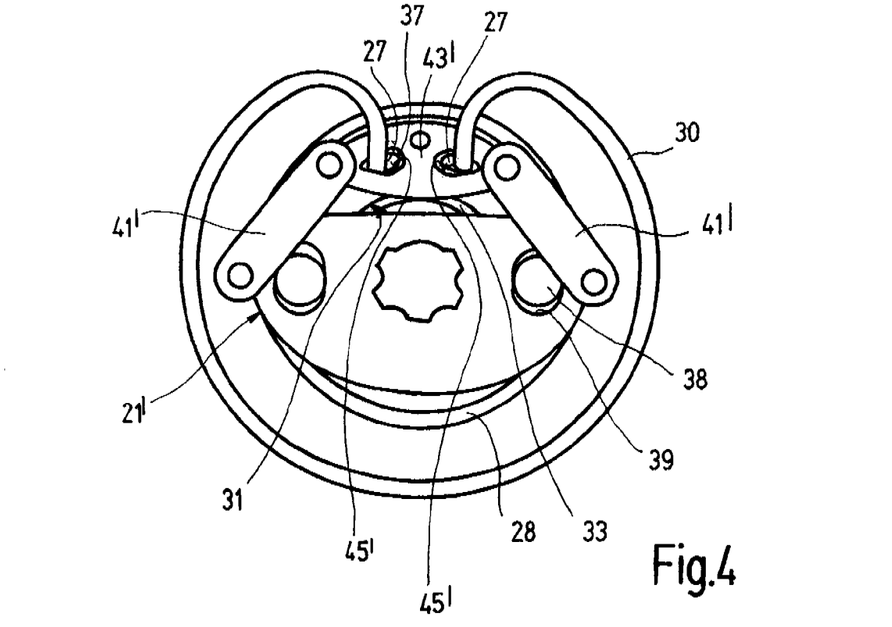
FIG. 4 is a partial view of a first modification of the first embodiment.

In a first modification to the first embodiment, which resembles the first embodiment except where described differently, the same components are provided with the same reference numerals and similarly acting components are provided with reference numerals with an apostrophe.

Two links 41' are articulated symmetrically on the driver 21', which in turn are articulated symmetrically on a connecting link 43'. The connecting link 43' is rotatably mounted in the running eccentric 31 which, for example, may be configured as a complete ring. Two sliding links 45' in the connecting link 43' allow the end fingers of the annular spring 30 to penetrate the slot 37 of the running eccentric 31 into the holes 29 of the wedge segments 27.

If the driver 21' is driven, it pivots the connecting link 43' by way of the links 41'. As a result of the shape of the sliding links 45', the end fingers of the annular spring 30 move toward one another until the wedge segments 27 bear against one another, so that the locking effect is canceled. The running eccentric 31 is rotated without lateral force due to the doubly present pins 38 and elongated holes 39.

Figure 5:
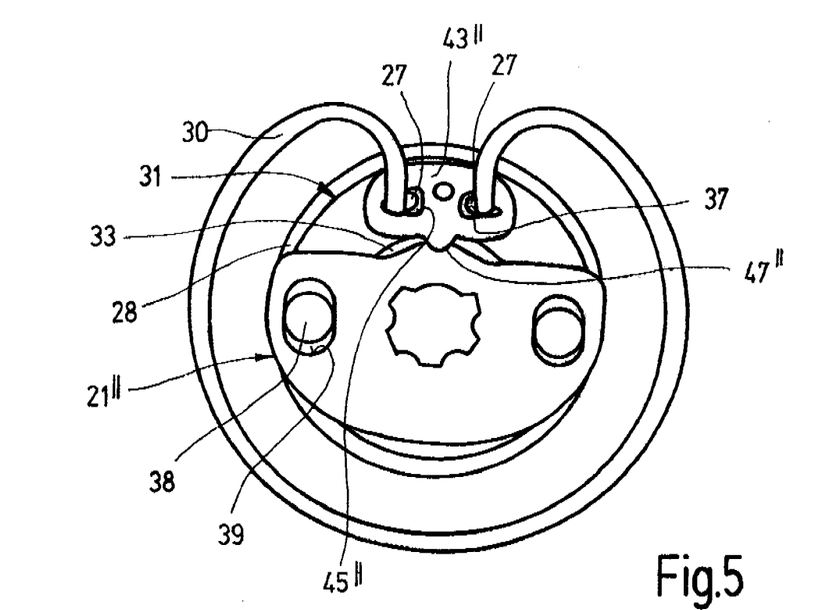
FIG. 5 is a partial view of a second modification of the first embodiment.

A second modification of the first embodiment resembles the first modification and the first embodiment except where described differently, which is why the same components are provided with the same reference numerals and similarly acting components are provided with reference numerals with two apostrophes.

The driver 21" and the connecting link 43" rotatably mounted in the running eccentric 31 are coupled by way of an involute toothing 47" to the sliding links 45". If the driver 21" is driven, it pivots the connecting link 43" by way of the involute toothing 47". As a result of the shape of the sliding links 45", the end fingers of the annular spring 30 move toward one another, until the wedge segments 27 bear against one another, so that the locking effect is canceled. The running eccentric 31, in turn, rotates without lateral force.

Figure 6:
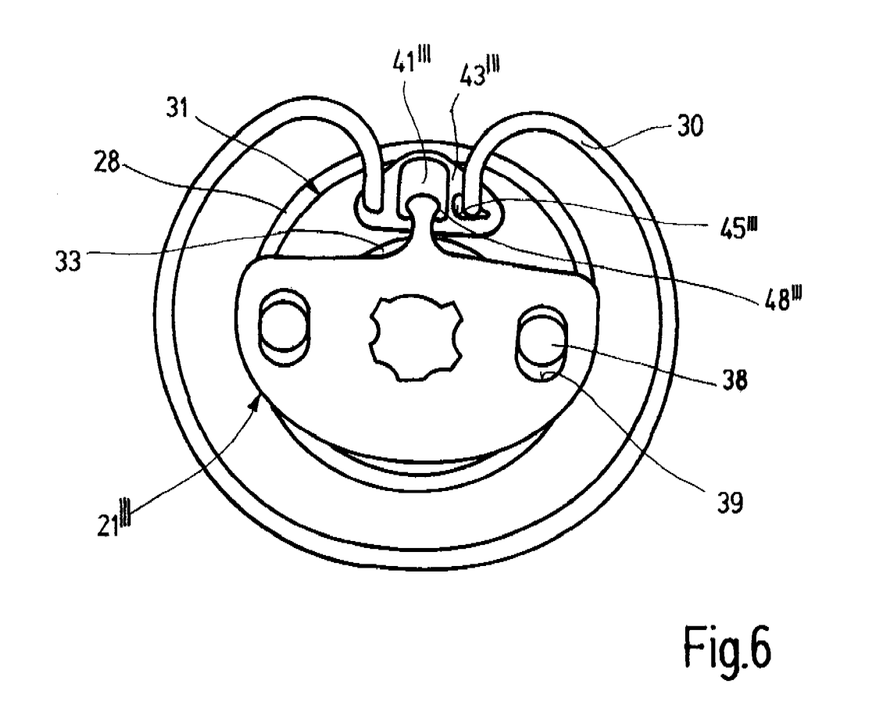
FIG. 6 is a partial view of a third modification of the first embodiment.

A third modification of the first embodiment resembles the above modifications and the first embodiment except where described differently, which is why the same components are provided with the same reference numerals and similarly acting components are provided with reference numerals with three apostrophes.

Due to the loading of the backrest 4 in the loading direction, one of the two wedge segments 27 is loaded less and one is loaded more. The driver 21''' is linked at a coupling point 48''' to a link 41''', which is rotatably mounted on a connecting link 43'''. The connecting link 43''' is configured slightly asymmetrically and comprises only one sliding link 45'''. Specifically described, the sliding link 45''' is positioned on the side of the connecting link 43''' that is proximate the wedge segment 27 which is loaded less, while on the other side, the connecting link 43''' is mounted by way of the associated end finger (to the left in the drawings) of the annular spring 30 in the wedge segment 27 which is loaded more.

If the driver 21''' is driven, it pivots the connecting link 43''' by way of the coupling point 48''' and the link 41'''. As a result of the shape of the single sliding link 45''', the associated end finger (to the right in the drawings) of the annular spring 30 pulls the wedge segment 27, which is loaded less, to bear against the wedge segment 27 which is loaded more, so that the locking effect is canceled. The running eccentric 31, in turn, rotates without lateral force.

Figure 7:
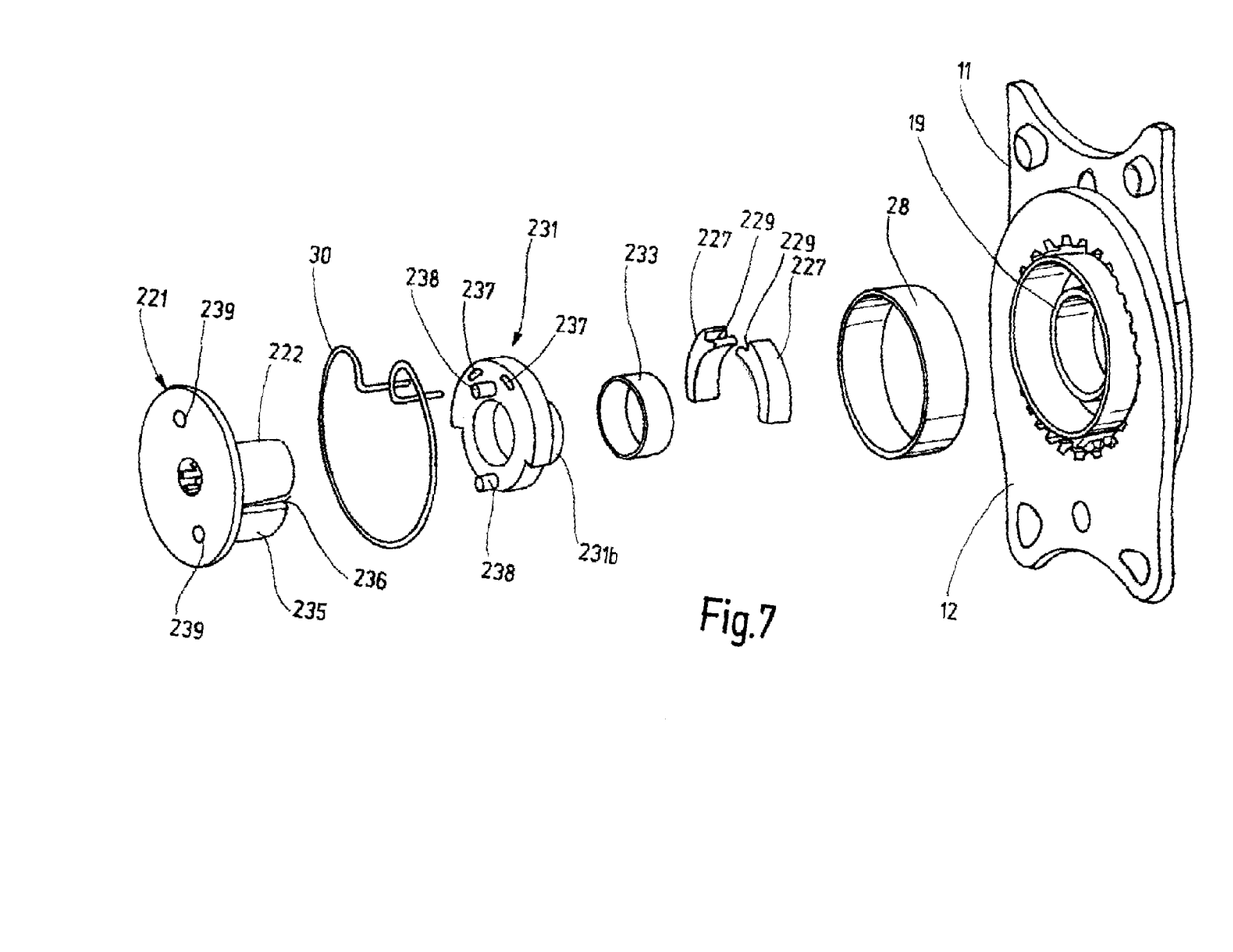
FIG. 7 is an exploded view of the second embodiment.
Figure 8:
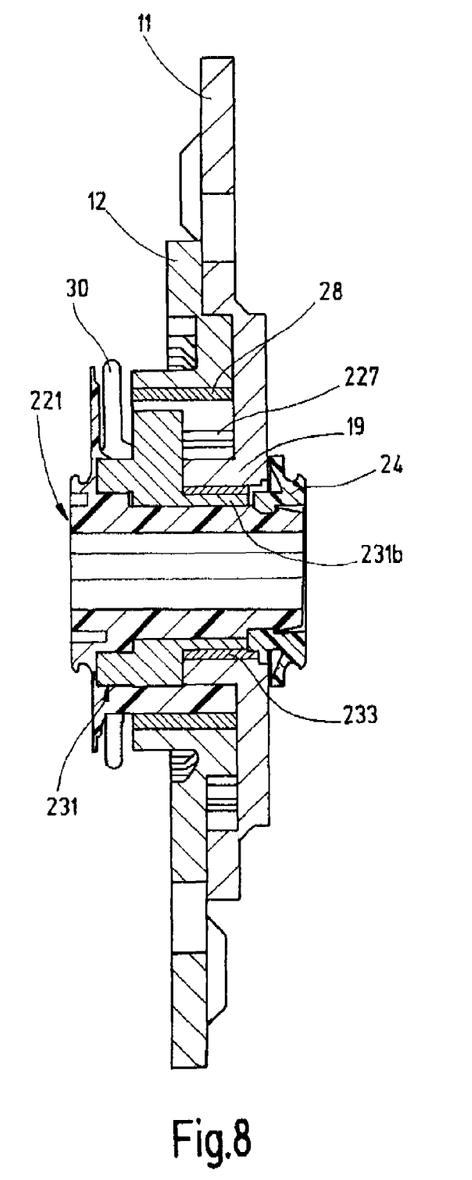
FIG. 8 is an axial section through the second embodiment.

A second embodiment resembles the first embodiment, which is why the same components bear the same reference numerals and similarly acting components bear reference numerals which are higher by 200. On the drive element 221 a driving segment 235 is formed on the front face with the hub 222. The driving segment 235 is delimited in the peripheral direction of the driver 221 by respective driving lugs 236. The driving segment 235 grips with its driving lugs 236 with play between the narrow ends of the wedge segments 227. The wedge segments 227 are located directly on the collar 19 of the first fitting part while the first plain bearing bushing 28, in turn, is pressed into the second fitting part 12.

The running eccentric 231 is of annular configuration and arranged axially between the driver 221 and the wedge segments 227. Two slots 237 that extend in the peripheral direction and axially penetrate the running eccentric 231 allow the end fingers of the annular spring 30 to penetrate, unhindered and with play, the opening jaws 229 (provided instead of the holes) of the wedge segments 227, without coupling the wedge segments 227 to the running eccentric 231. On the running eccentric 231, two axially protruding pins 238 are formed on the front face facing the driver 221. The two axially protruding pins 238 are located radially opposite one another. Each pin 238 engages positively into a hole 239 arranged in the peripheral direction. Thus, the driver 221 and the running eccentric 231 are coupled to one another fixedly in terms of rotation, i.e. coupled for rotationally fixed locking.

The second plain bearing bushing 233 is pressed onto a hub-like axial projection 231b of the running eccentric 231 and arranged inside the collar 19, i.e. mounted in the collar 19. The hub 222 of the driver 221 is arranged, in turn, inside the running eccentric 231, i.e. the driver 221 is mounted by the interposition of the running eccentric 231 with the second plain bearing bushing 233 on the first fitting 11.

During the driving, a torque is first introduced into the driver 221 and then transferred to the locking eccentric, by one of the driving lugs 236 impinging on the associated wedge segment 227 and pressing the wedge segments 227 together. By way of the holes 239 and pins 238, the running eccentric 231 is impinged upon and driven. More specifically and due to the symmetry, the running eccentric 231 is impinged upon and driven without lateral force. The running eccentric 231 then slides with substantially the same (low) friction at each of the plain bearing bushings 28 and 233, resulting in the rolling movement of the fitting parts 11 and 12 relative to one another.

Figure 9:
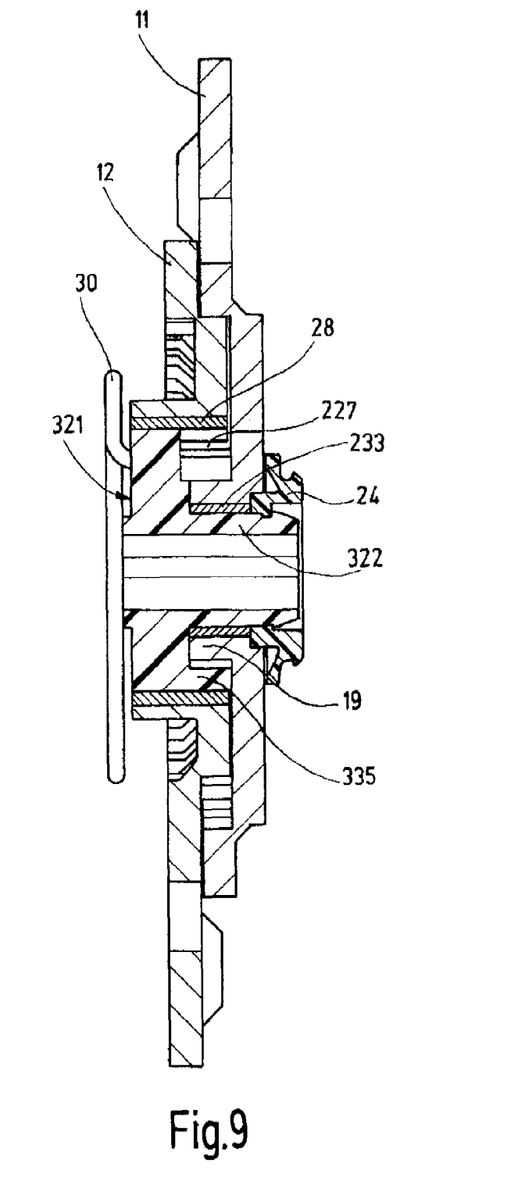
FIG. 9 is an axial section through the third embodiment.
Figure 10:
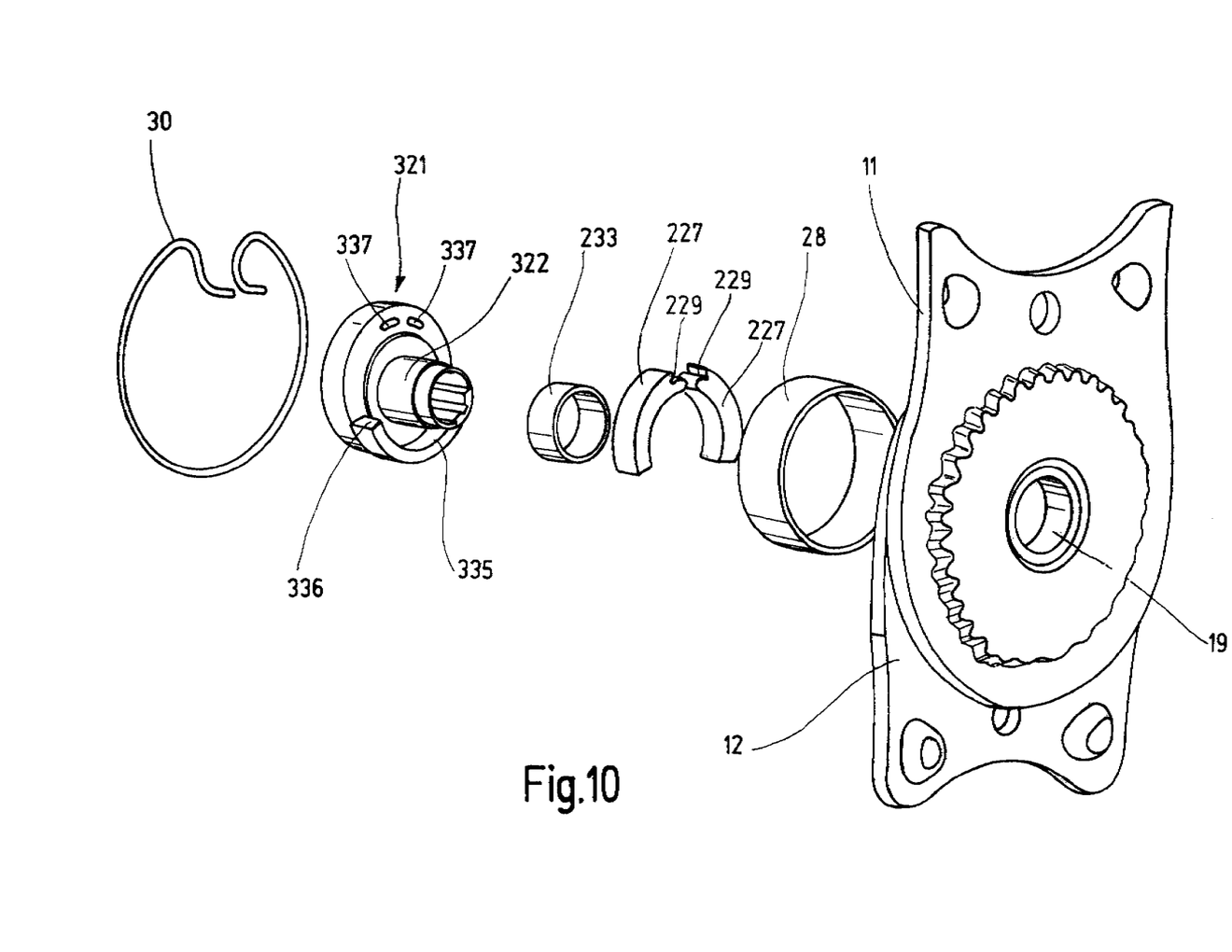
FIG. 10 is an exploded view of the third embodiment.

A third embodiment resembles the first and second embodiments except where described differently, which is why the same components bear the same reference numerals and similarly acting components bear reference numerals which are higher by 300 and/or 100. The driver 321 of the third embodiment is simultaneously configured as a running eccentric and undertakes the tasks thereof, i.e. the driver and the running eccentric, which were hitherto functionally separate, are configured in one piece with one another and/or merely different regions of the same component. Thus the driver and the running eccentric are always automatically connected fixedly in terms of rotation and the running eccentric is always automatically driven by the driver. A driving segment 335 is formed on the driver 321, on the front face with the hub 322. The driving segment 335 is delimited in the peripheral direction of the driver 321 by respective driving lugs 336. The driving segment 335 grips with its driving lugs 336 with play between the narrow ends of the wedge segments 227.

The wedge segments 227 are located directly on the collar 19 of the first fitting part, while the first plain bearing bushing 28, in turn, is pressed into the second fitting part 12. The second plain bearing bushing 233 is pressed onto the hub 322 of the driver 321 and arranged inside the collar 19, i.e. mounted in the collar 19. Two slots 337 extending in the peripheral direction and axially penetrating the driver 321 allow the end fingers of the annular spring 30 to penetrate unhindered and with play the opening jaws 229 (provided instead of the holes) of the wedge segments 227, without at this point coupling the wedge segments 227 to the driver 321. In a modified embodiment, precisely this coupling of the wedge segments 227 to the driver 321 could be desired, i.e. the slots 337 would be developed to form sliding links for the end fingers of the annular spring 30, holes would be provided in the wedge segments, and the driving segment 335 would be omitted.

During driving, a torque is introduced into the driver 321 and then transferred to the locking eccentric by one of the driving lugs 336 impinging on the associated wedge segment 227 and pressing the wedge segments 227 together. Due to the one-piece design, the driver 321 rotates without lateral force. It slides with substantially the same (low) friction at each of the plain bearing bushings 28 and 233, resulting in the rolling movement of the fitting parts 11 and 12 relative to one another.

Figure 11:
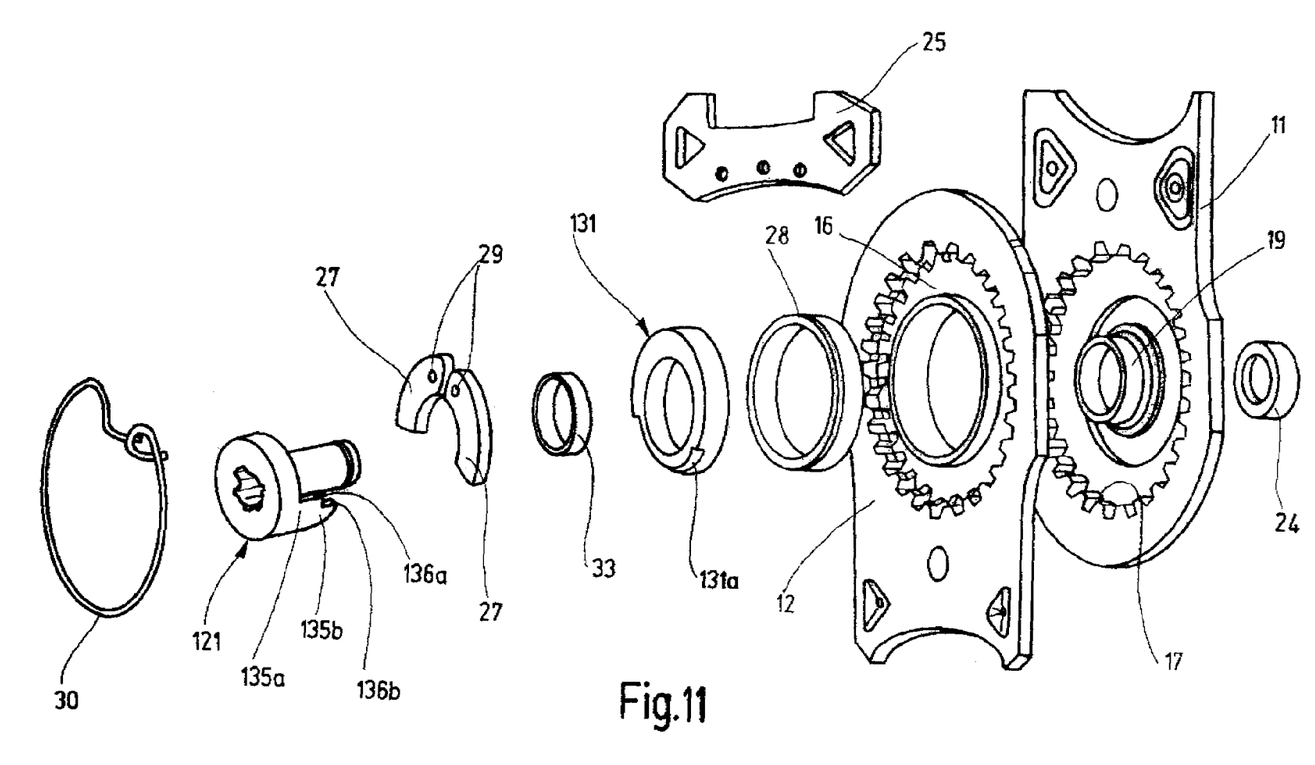
FIG. 11 is an exploded view of the fourth embodiment.
Figure 12:
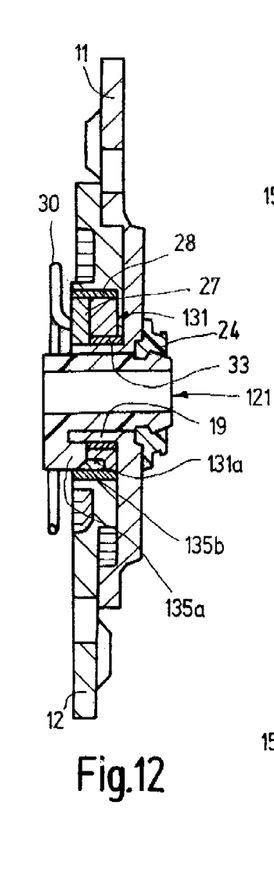
FIG. 12 is an axial section through the fourth embodiment.

In a fourth embodiment, the force conditions, in particular the frictional conditions, are selected such that the lateral forces are not especially important. This allows a simplified coupling between the driver and the running eccentric. In other respects, the fourth embodiment resembles the first embodiment, even regarding the wedge segment control, which is why the same components are provided with the same reference numerals and similarly acting components are provided with reference numerals which are higher by 100.

On the driver 121 of the fourth embodiment, a first driving segment 135a and a second driving segment 135b axially attached to the first driving segment 135a are formed on the front face with the hub 22 in a stepped shape. The first driving segment 135a is delimited in the peripheral direction by respective first driving lugs 136a, while the second driving segment 135b is accordingly delimited by respective second driving lugs 136b. The first driving segment 135a grips with play with its first driving lugs 136a between the narrow ends of the wedge segments 27. The second driving segment 135b grips with greater play with its second driving lugs 136b into a recess 131a of the running eccentric 131 of the fourth embodiment. The running eccentric 131 is of annular configuration and arranged axially between the wedge segments 27 and the first fitting part 11. The end fingers of the annular spring 30 engage directly in the holes 29 of the wedge segments 27.

During the driving, a torque is firstly introduced into the driver 121 and then transferred to the locking eccentric, by one of the first driving lugs 136a impinging on the associated wedge segment 27 and pressing the wedge segments 27 together, i.e. the locking effect of the locking eccentric is canceled. With the further rotation of the driver 121, the idle motion is passed through, which is defined by the difference of the (smaller) play between the first driving segment 135a and the wedge segments 17, on the one hand, from the (greater) play between the second driving segment 135b and the size of the recess 131a of the running eccentric 131 in the peripheral direction, on the other hand. If the idle motion is passed through, the running eccentric 131 is impinged upon by the second driving lug 136b which has come to rest and is driven by the second driving segment 135b. The further functions of the driver 121 and the running eccentric 131, including the low-friction mounting thereof by way of the two plain bearing bushings 28 and 33, have already been described in connection with the corresponding driver 21 and running eccentric 31.

Modifications are possible to the disclosed fourth embodiment which differ in the control of the wedge segments 27. This control—as in the case of the modifications to the first embodiment—is carried out by using the annular spring 30, so that the first driving segment 135a is omitted and/or coincides with the second driving segment 135b.

Figure 13:
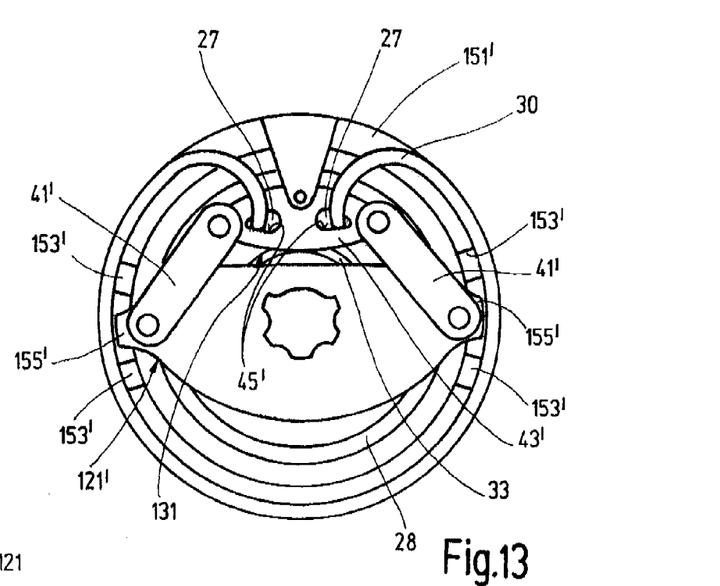
FIG. 13 is a partial view of a first modification of the fourth embodiment.

In a first modification to the fourth embodiment, which resembles the fourth embodiment except where described differently, the same components are provided with the same reference numerals and similarly acting components are provided with reference numerals with an apostrophe. Relative to the first modification of the first embodiment, the same components are provided with the same reference numerals and similarly acting components are provided with reference numerals which are higher by 100.

Two links 41' are articulated symmetrically on the driver 121', which in turn are articulated symmetrically on a connecting link 43'. The connecting link 43' is rotatably mounted on a support ring 151' which has approximately the same diameter as the annular spring 30 and two pairs of axially projecting driving projections 153'. Two sliding links 45' in the connecting link 43' allow the end fingers of the annular spring 30 to penetrate the holes 29 of the wedge segments 27.

If the driver 121' is driven, it pivots the connecting link 43' by way of the links 41', while it rotates the support ring 151' with two radially projecting driving arms 155', each of which being arranged between a pair of driving projections 153'. As a result of the shape of the sliding links 45', the end fingers of the annular spring 30 move toward one another, until the wedge segments 27 bear against one another, so that the locking effect is canceled. If the idle motion between the second driving lug 136b and the boundary of the recess 131a is passed through, the running eccentric 131 is driven by the second driving segment 135b.

Figure 14:
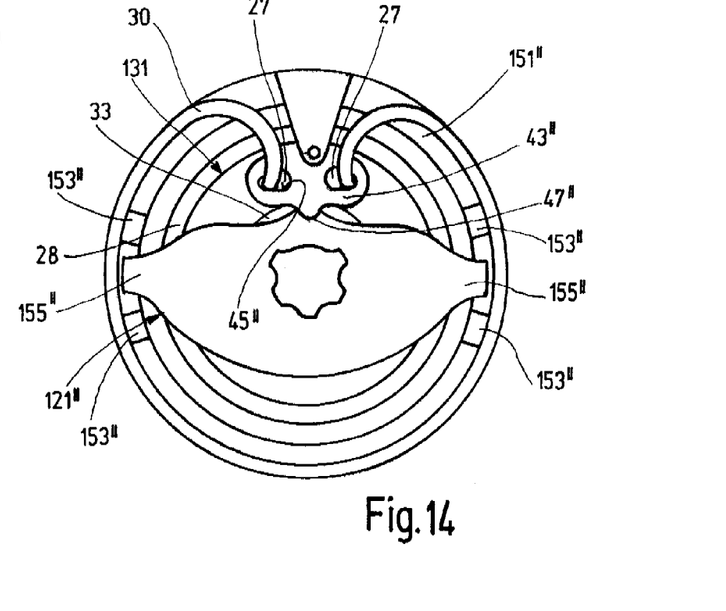
FIG. 14 is a partial view of a second modification of the fourth embodiment.

A second modification to the fourth embodiment resembles the first modification and the first embodiment except where described differently, which is why the same components are provided with the same reference numerals and similarly acting components are provided with reference numerals with two apostrophes. Relative to the second modification of the first embodiment, the same components are provided with the same reference numerals and similarly acting components are provided with reference numerals which are higher by 100.

The driver 121" and the connecting link 43" rotatably mounted on the support ring 151" are coupled by way of an involute toothing 47" to the sliding links 45". If the driver 121" is driven, it pivots the connecting link 43" by way of the involute toothing 47". As a result of the shape of the sliding links 45", the end fingers of the annular spring 30 move toward one another, until the wedge segments 27 bear against one another, so that the locking effect is canceled. The driver 121" drives the support ring 151" by way of the driving arms 155" which are arranged between the driving projections 153", and drives the running eccentric 131 by way of the second driving segment 135b.

It will be understood by those skilled in the art that while the present invention has been discussed above with reference to exemplary embodiments, various additions, modifications That which is claimed:

1. A fitting for a vehicle seat, the fitting comprising:
a first fitting part;
a second fitting part in geared connection with the first fitting part;
a locking eccentric that is at least for locking the fitting, wherein the locking eccentric is mounted on the first fitting part and at least partially supports the second fitting part at least while the fitting is locked;
a running eccentric that is at least for driving a relative rolling movement of the second fitting part on the first fitting part for adjusting the fitting, wherein the running eccentric is mounted on the first fitting part and at least partially supports the second fitting part at least during the adjusting of the fitting; and
a driver mounted for being rotated relative to the first fitting part and adapted for
(a) controlling the locking eccentric to unlock the fitting at a start of an adjusting movement, and
(b) driving at least the running eccentric during the adjusting movement so that the running eccentric drives the relative rolling movement of the second fitting part on the first fitting part, wherein
bearing bushings are respectively positioned between the running eccentric and the first and second fitting parts,
friction between at least one pair of components is less than friction between the locking eccentric and at least one of the first and second fitting parts,
the pair of components is selected from the group consisting of
(a) the running eccentric and one of the bearing bushings, and
(b) one of the bearing bushings and a respective one of the first and second fitting parts,
the bearing bushings comprise a first plain bearing bushing and a second plain bearing bushing,
the running eccentric comprises a first surface and a second surface,
the second surface of the running eccentric is positioned radially inwardly of the first surface of the running eccentric, with respect to an axis of rotation of the running eccentric,
the first surface of the running eccentric bears against the first plain bearing bushing, and
the second surface of the running eccentric bears against the second plain bearing bushing.

2. The fitting according to claim 1, wherein:
the first plain bearing bushing and a first element are connected to one another so as to be rotationally fixed with respect to one another;
the second plain bearing bushing and a second element are connected to one another so as to be rotationally fixed with respect to one another; and
the first and second elements are selected from the group consisting of the first surface of the running eccentric, the second surface of the running eccentric, the first fitting part and the second fitting part.

3. The fitting according to claim 1, wherein the running eccentric is annular or sickle-shaped.

4. The fitting according to claim 1, wherein:
the locking eccentric comprises two wedge segments; and
the driver controls the locking eccentric, to unlock the fitting at the start of an adjusting movement, by way of (a) a driving segment for respectively acting on the wedge segments and bringing the wedge segments at least closer to one another, or
(b) a substantially annular spring for respectively acting on the wedge segments and bringing the wedge segments at least closer to one another.

5. The fitting according to claim 1, wherein:
the locking eccentric comprises two wedge segments;
the driver controls the locking eccentric, to unlock the fitting at the start of an adjusting movement, by way of a substantially annular spring; and
the driver is coupled to a pivotable connecting link that moves at least one end finger of the annular spring that is engaging in one of the wedge segments, for at least bringing the one of the wedge segments at least closer to another of the wedge segments.

6. The fitting according to claim 5, wherein the driver is coupled to the connecting link by way of links and/or an involute toothing and/or a coupling point.

7. The fitting according to claim 5, wherein the connecting link is mounted on the running eccentric or on an end finger of the annular spring.

8. The fitting according to claim 5, wherein:
the running eccentric is arranged axially between the driver and the locking eccentric;
slots extend through the running eccentric; and
end fingers of the annular spring respectively extend substantially unhindered through the slots and respectively penetrate the wedge segments.

9. The fitting according to claim 1, wherein the driver rotates, and the rotating driver impinges on the running eccentric without lateral force.

10. The fitting according to claim 9, wherein the driver and the running eccentric are connected to one another so as to be rotationally fixed with respect to one another.

11. The fitting according to claim 9, wherein:
the driver impinges on the running eccentric at at least two points;
the two points are distributed uniformly over a periphery;
the two points are at a same distance from an axis of rotation; and
both the driver and the running eccentric rotate about the axis of rotation.

12. The fitting according to claim 9, comprising two pins and two holes, wherein
the driver impinges on the running eccentric by way of the two pins and the two holes;
the two pins are symmetrically arranged with respect to one another relative to an axis of rotation of the driver; and
the two holes are symmetrically arranged with respect to one another relative to the axis of rotation of the driver.

13. The fitting according to claim 11, wherein the driver and the running eccentric are connected to one another so as to be rotationally fixed with respect to one another.

14. The fitting according to claim 1, wherein the driver comprises the running eccentric.

15. The fitting according to claim 1, wherein:
the running eccentric is mounted by way of the second plain bearing bushing being positioned between the running eccentric and a collar of the first fitting part; and
the second plain bearing bushing is on or in the collar of the first fitting part.

16. The fitting according to claim 1 in combination with the vehicle seat, wherein:

the vehicle seat has a seat part and a backrest; and
the fitting is for adjusting an inclination of the backrest relative to the seat part.

17. The fitting according to claim 1, wherein:
the locking eccentric comprises two wedge segments;
the driver comprises a driving segment; and
the driver controls the locking eccentric, to unlock the fitting at the start of an adjusting movement, by way of the driving segment forcing one of the wedge segments toward another of the wedge segments.

18. The fitting according to claim 1, wherein:
the locking eccentric comprises two wedge segments; and
the driver controls the locking eccentric, to unlock the fitting at the start of an adjusting movement, by way of a substantially annular spring forcing at least one of the wedge segments toward another of the wedge segments.

19. The fitting according to claim 1, wherein:
the driver is mounted for rotating about an axis;
the driver controls the locking eccentric and drives the running eccentric in response to the driver being rotated about the axis;
the axis extends in an axial direction; and
the locking eccentric and the running eccentric are adjacent to one another in the axial direction.

20. The fitting according to claim 1, wherein:
a driver includes a first driving segment and a second driving segment;
the driver is for controlling the locking eccentric, to unlock the fitting at the start of an adjusting movement, by way of the first driving segment; and
the driver is for driving the running eccentric, during the adjusting movement, by way of the second driving segment.

21. The fitting according to claim 20, wherein:
the driver is mounted for rotating about an axis;
the driver controls the locking eccentric, by way of the first driving segment, and drives the running eccentric, by way of the second driving segment, in response to the driver being rotated about the axis;
the axis extends in an axial direction;
one of the first and second driving segments extends farther in the axial direction than the other of the first and second driving segments.

22. The fitting according to claim 20, wherein:
the locking eccentric includes wedge segments;
each of the wedge segments includes an end;
the first driving segment is positioned between the ends of wedge segments so that a first play is defined between the first driving segment and the ends of wedge segments;
the running eccentric includes a recess having opposite ends;
the second driving segment is positioned in the recess so that a second play is defined between the second driving segment and the ends the recess; and
the second play is greater than the first play.

23. The fitting according to claim 1, wherein:
the first and second fitting parts are at least partially mounted by way of the locking eccentric while the fitting is locked; and
the first and second fitting parts are substantially mounted by way of the running eccentric, rather than the locking eccentric, during the relative rolling movement of the second fitting part on the first fitting part for adjusting the fitting.

* * * * *